US008909969B2

(12) United States Patent
Xu et al.

(10) Patent No.: US 8,909,969 B2
(45) Date of Patent: Dec. 9, 2014

(54) METHOD, APPARATUS, AND SYSTEM FOR PERFORMING TIME SYNCHRONIZATION ON PCIE DEVICES

(75) Inventors: Huifeng Xu, Hangzhou (CN); Baifeng Yu, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 273 days.

(21) Appl. No.: 13/571,812

(22) Filed: Aug. 10, 2012

(65) Prior Publication Data

US 2013/0042136 A1 Feb. 14, 2013

Related U.S. Application Data

(63) Continuation of application No. PCT/CN2011/078291, filed on Aug. 11, 2011.

(51) Int. Cl.

| | |
|---|---|
| ***G06F 1/12*** | (2006.01) |
| ***H04J 3/06*** | (2006.01) |
| ***H04L 7/00*** | (2006.01) |
| ***G06F 15/16*** | (2006.01) |
| ***G06F 13/42*** | (2006.01) |
| ***G06F 13/14*** | (2006.01) |
| ***H04W 56/00*** | (2009.01) |

(52) U.S. Cl.

CPC .................................... *H04W 56/00* (2013.01)
USPC ........... 713/400; 370/350; 375/354; 709/230; 710/105; 710/305

(58) Field of Classification Search

CPC ..................................................... H04W 56/00
USPC ........... 713/400; 370/350; 375/354; 709/230; 710/105, 305
See application file for complete search history.

(56) References Cited

U.S. PATENT DOCUMENTS

| | | | | |
|---|---|---|---|---|
| 7,876,790 B2 * | 1/2011 | Cho et al. | ...................... | 370/503 |
| 8,116,405 B2 * | 2/2012 | Cho et al. | ...................... | 375/316 |
| 8,385,333 B2 * | 2/2013 | Stanton et al. | ................ | 370/389 |
| 8,402,169 B2 * | 3/2013 | Katsuo | .......................... | 709/248 |
| 8,670,439 B2 * | 3/2014 | Wei et al. | ...................... | 370/350 |

(Continued)

FOREIGN PATENT DOCUMENTS

| | | |
|---|---|---|
| CN | 101388741 A | 3/2009 |
| CN | 101609442 A | 12/2009 |

(Continued)

OTHER PUBLICATIONS

Search report & Written Opinion issued in corresponding PCT application No. PCT/CN2011/078291, dated May 17, 2012, total 18 pages.

*Primary Examiner* — Stefan Stoynov
(74) *Attorney, Agent, or Firm* — Huawei Technologies Co., Ltd.

(57) ABSTRACT

Embodiments of the present invention provide a method, an apparatus, and a system for performing time synchronization on PCIE (PCI Express, peripheral component interconnect express) devices. The method mainly includes: a PCIE device receiving, through a hardware interface, a time synchronization signal sent from a clock source device; parsing, by the PCIE device, the time synchronization signal to obtain clock information carried in the time synchronization signal, and using the clock information as a clock of the PCIE device. The PCIE devices are supported to access a synchronous network, and the PCIE devices are supported to be used as a global clock source.

8 Claims, 3 Drawing Sheets

(56) References Cited

U.S. PATENT DOCUMENTS

| | | | |
|---|---|---|---|
| 2005/0273590 | A1 | 12/2005 | Chang |
| 2010/0315135 | A1 | 12/2010 | Lai |
| 2010/0329285 | A1 | 12/2010 | Stanton et al. |
| 2011/0002429 | A1 | 1/2011 | Williams et al. |

FOREIGN PATENT DOCUMENTS

| | | | |
|---|---|---|---|
| CN | 101881938 | A | 11/2010 |
| CN | 101937253 | A | 1/2011 |
| CN | 101946219 | A | 1/2011 |
| CN | 102017652 | A | 4/2011 |

* cited by examiner

METHOD, APPARATUS, AND SYSTEM FOR PERFORMING TIME SYNCHRONIZATION ON PCIE DEVICES

CROSS-REFERENCE TO RELATED APPLICATIONS

This application is a continuation of International Application No. PCT/CN2011/078291, filed on Aug. 11, 2011, which are hereby incorporated by reference in their entireties.

FIELD OF THE INVENTION

The present invention relates to the field of communications technologies, and in particular, to a method, an apparatus, and a system for performing time synchronization on PCIE devices.

BACKGROUND OF THE INVENTION

Currently, PCIE (PCI Express, peripheral component interconnect express) devices are applied rather widely, and interfaces of various PCIE devices are also applied widely in various fields. Interfaces of current PCIE devices are mainly of types such as an asynchronous Ethernet, an Infiniband, and a Fiber Channel (fiber channel). When working, such interfaces neither depend on a synchronous clock nor impose requirements on time synchronization and precision of the PCIE devices. With the convergence of the IT (Information Technology, information technology) and the CT (communications Technology, communications technology), the PCIE devices are required to support a synchronous network.

A reference clock in 100 MHz adopted by the PCIE devices has a very large difference from a reference clock of synchronous communications. In addition, no signal related to the time synchronization is defined in the PCIE regulations. In the prior art, a method for implementing the time synchronization among PCIE devices mainly includes: installing an independent synchronous device on each PCIE device, so as to achieve the clock and time synchronization among the different PCIE devices.

During the implementation of the present invention, the inventor finds that the foregoing method for implementing the time synchronization among the PCIE devices in the prior art at least has the following problem: each PCIE device needs an independent time serving device, which causes high cost and difficult maintenance of the PCIE device.

SUMMARY OF THE INVENTION

Embodiments of the present invention provide a method, an apparatus, and a system for performing time synchronization on PCIE devices, which may satisfy requirements of the PCIE devices for clock synchronization or the time synchronization.

A method for performing time synchronization on a peripheral component interconnect express PCIE device includes:

- receiving, by the PCIE device through the synchronization signal interface, a time synchronization signal separately sent from a clock source device, wherein the synchronization signal comprises a 1 pulse per second (1 PPS) signal and a Time Of Date (TOD) signal;
- parsing, by the PCIE device, the time synchronization signal to obtain clock information and time signal carried in the time synchronization signal; and
- performing, by PCIE device, the time synchronization according to the clock information and the time signal.

A system for performing time synchronization on a peripheral component interconnect express PCIE device includes:

- a clock source device, configured to send a time synchronization signal to the PCIE device, wherein the clock source device and the PCIE device are independent from each other; and
- the PCIE device, comprising a synchronization signal interface, and configured to receive, through the synchronization signal interface, the time synchronization signal separately sent from the clock source device, parse the time synchronization signal to obtain clock information and time signal carried in the time synchronization signal, and perform the time synchronization according to the clock information and the time signal, wherein the synchronization signal comprises a 1 pulse per second (1 PPS) signal and a Time Of Date (TOD) signal.

A peripheral component interconnect express PCIE device includes a hardware interface that is used as a synchronization signal interface and a time synchronization processing module. The synchronization signal interface receives a time synchronization signal sent from a clock source device, wherein the synchronization signal interface is a hardware interface, the synchronization signal comprises a 1 pulse per second (1 PPS) signal and a Time Of Date (TOD) signal; the time synchronization processing module, configured to parse the time synchronization signal to obtain clock information and time signal carried in the time synchronization signal, and perform the time synchronization according to the clock information and the time signal.

From the technical solutions provided in the foregoing embodiments of the present invention, it can be seen that, in the embodiments of the present invention, a PCIE device receives, through a hardware interface, a time synchronization signal sent from a clock source device and performs time synchronization processing according to the time synchronization signal, so that the requirements of the PCIE device for the clock synchronization or the time synchronization may be satisfied.

DETAILED DESCRIPTION OF THE EMBODIMENTS

Embodiment 1

Figure 1:
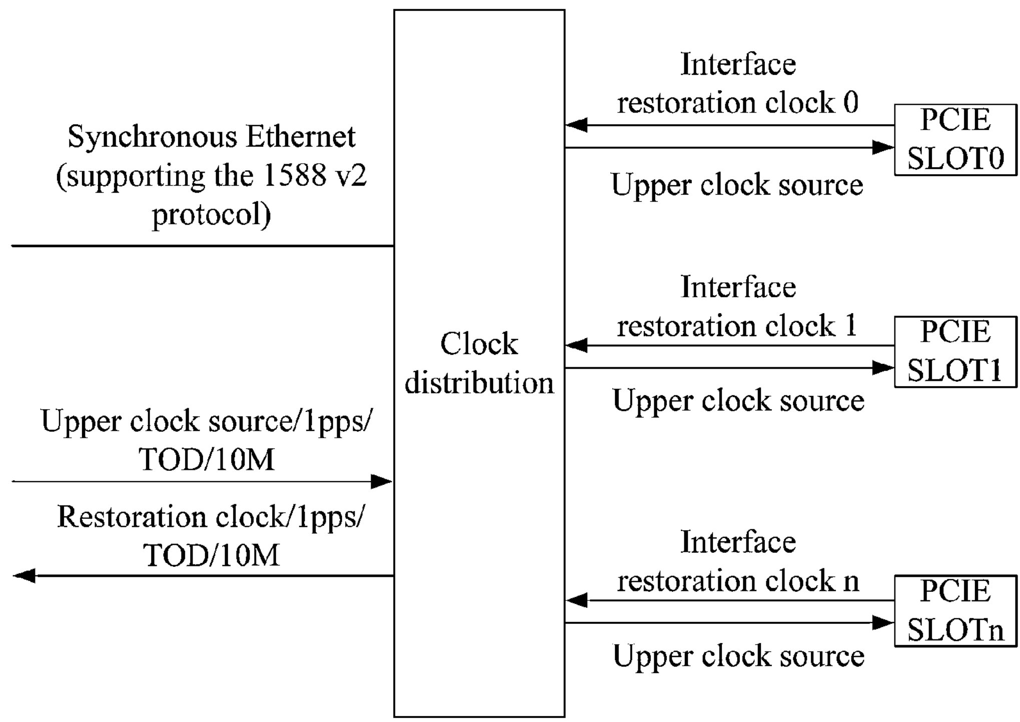
FIG. 1 is a schematic diagram of a principle of a method for performing time synchronization on PCIE devices according to Embodiment 1 of the present invention.
Figure 2:
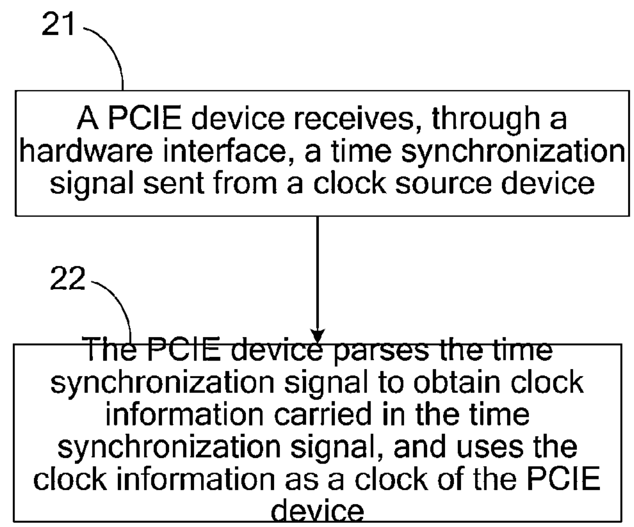
FIG. 2 is a flow chart of specific processing of a method for performing time synchronization on PCIE devices according to Embodiment 1 of the present invention.

A schematic diagram of a principle of a method for performing time synchronization on PCIE devices provided in the embodiment is shown in FIG. 1. The specific processing flow is shown in FIG. 2, including the following processing steps.

Step 21: A PCIE device receives, through a hardware interface, a time synchronization signal sent from a clock source device.

In the embodiment of the present invention, a hardware interface needs to be added to a PCIE device and is used as a synchronization signal interface. The PCIE device receives or outputs, through the hardware interface, the time synchronization signal.

The foregoing hardware interface may include two forms.

In a first form, a retained definition pin in the PCIE standard definitions may be used. The signals required by the pin may include a 1 PPS signal (or a clock or pulse having another frequency or period), a TOD signal, or a synchronous clock (a clock signal required by synchronous networks such as in 8 KHz, 38.88 MHz, and 122.88 MHz). A specific signal definition may be determined according to requirements of actual layout and wiring.

Figure 3:
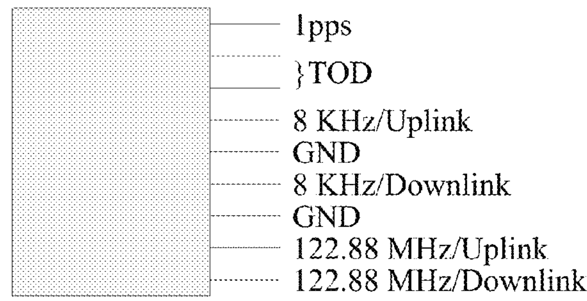
FIG. 3 is a schematic diagram of an independent hardware interface added to a PCIE device according to Embodiment 1 of the present invention.

In a second form, an independent hardware interface may be added to a PCIE device. The interface should include part or all of the signals defined in form 1. For example, a 10-pin interface shown in FIG. 3 is added.

The above is an example of one type of interface. In practice, a signal definition and an electrical characteristic may need to be added or deleted. For example, a single-ended signal may be used, and also a differential signal may be used.

Through form 1 or form 2, the PCIE device may obtain a synchronous clock of the interface, a high-precision time signal and so on, through an internal clock phase discrimination circuit (which may be implemented through a logic, or through a dedicated clock chip), a TOD communication interface and so on, so as to implement the synchronization.

In the embodiment of the present invention, another device independent from the PCIE device is required to be set as the clock source device. The clock source device and the PCIE device are independent from each other and are equal in status.

The foregoing clock source device sends the time synchronization signal of the PCIE device to the foregoing hardware interface of the PCIE device. When the number of the foregoing PCIE devices is more than one, the clock source device needs to send the foregoing time synchronization signal to each PCIE device separately.

Step 22: The PCIE device performs the time synchronization processing according to the time synchronization signal.

After receiving the time synchronization signal through the foregoing hardware interface, the PCIE device parses, through an exclusive chip or an FPGA (Field-Programmable Gate Array, field-programmable gate array), the time synchronization signal to extract clock information carried in the time synchronization signal and uses the clock information as a clock of the PCIE device.

When the number of the foregoing PCIE devices is more than one, since the clocks of all PCIE devices are the same, the clock synchronization among a plurality of PCIE devices is implemented.

From the technical solution provided in the foregoing embodiment of the present invention, it can be seen that, in the embodiment of the present invention, a PCIE device receives, through a hardware interface, a time synchronization signal sent from a clock source device and performs the time synchronization processing according to the time synchronization signal, so that requirements of PCIE devices for the clock synchronization or the time synchronization may be satisfied.

Specifically, the foregoing hardware interface may be independent from an existing PCIE interface of the PCIE device. That is, extra hardware connection is added to the PCIE device. Also, some modifications may be made to the definition of the existing PCIE interface. For example, the signal retained in the existing standards of the PCIE is defined as a clock related signal, and the modified PCIE interface is used as the foregoing hardware interface.

Specifically, the clock source device parses a received clock signal from an upper-level clock source device or a time synchronization network to obtain a time synchronization signal of the PCIE device. For example, the clock source device may receive a clock signal, which is sent from a synchronous Ethernet through the 1588 V2 protocol, parse the clock signal, and then obtain a reference pulse that may be used as the time synchronization signal of the PCIE device. Still for example, the clock source device may receive a 1 PPS (1 pulse per second, pulse per second), a TOD (Time Of Date, time of date), and another clock signal/command that are sent from the upper-level clock source device, parse the clock signal/command, and then obtain a time synchronization signal of the PCIE device. In actual applications, the foregoing upper-level clock source device may be a device such as a GPS satellite, the BeiDou System, or a PCIE device having a high-precision clock signal.

Specifically, the foregoing time synchronization signal may be a signal such as the 1 PPS and the TOD, or another frequency signal or pulse signal.

Further, a master clock source device and a slave clock source device may be set at the same time. When the master clock source device has a failure or when no time synchronization signal sent by the master clock source device meets the requirement, the master clock source device and the slave clock source device are switched, and the master clock source device is replaced with the slave clock source device to send the time synchronization signal to the PCIE device.

Figure 4:
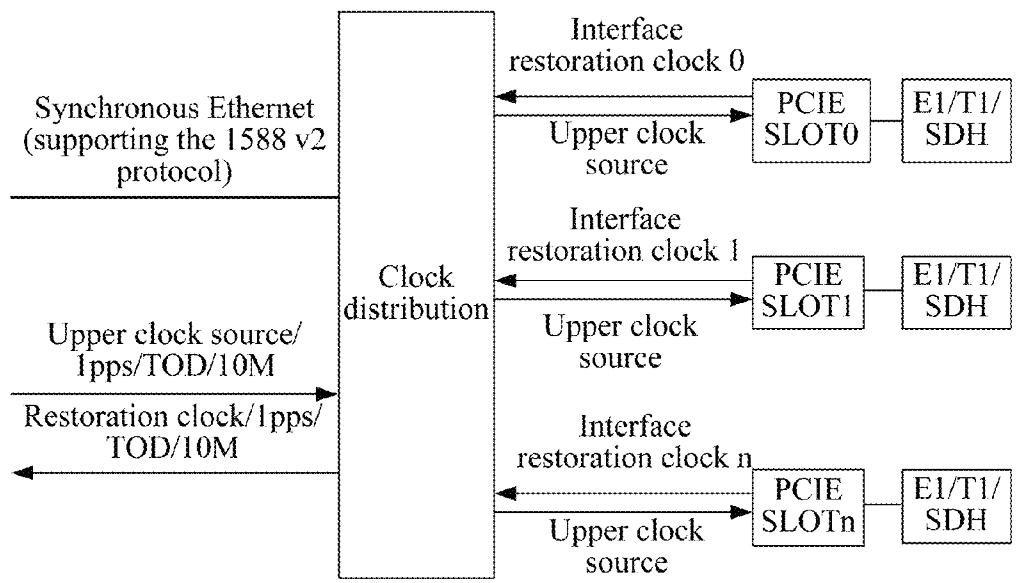
FIG. 4 is a schematic diagram of connecting an E1/T1/SDH (Synchronous Digital Hierarchy, synchronous digital hierarchy) interface to each PCIE device according to Embodiment 1 of the present invention.

Further, as shown in FIG. 4, an interface such as an E1/T1/SDH (Synchronous Digital Hierarchy, synchronous digital hierarchy) is connected to each PCIE device and is used as an external interface of the PCIE device. The PCIE device is enabled to support a synchronous network, so that in some cases, the PCIE device may be supported to be used to access an external network, thereby reducing requirements for router interfaces, and richer network characteristics may be supported.

From the technical solution provided in the foregoing embodiment of the present invention, it can be seen that, in the embodiment of the present invention, a PCIE device receives, through a hardware interface, a time synchronization signal sent from a clock source device and performs the time synchronization processing according to the time synchronization signal, thereby implementing that the time synchronization on PCIE devices is performed.

Through the embodiment of the present invention, a hardware processing mechanism is adopted. The PCIE device is supported to access a synchronous network, and the PCIE device is supported to be used as a global clock source. Requirements of current wireless communication devices for the GPS are reduced; the reliability and security of the system are increased; the cost of the system is lowered; and the maintenance thereof is easy.

Through the embodiment of the present invention, an equal relationship among the PCIE devices is implemented, and the time reference source is unrelated to the statuses of the devices.

Embodiment 2

Figure 5:
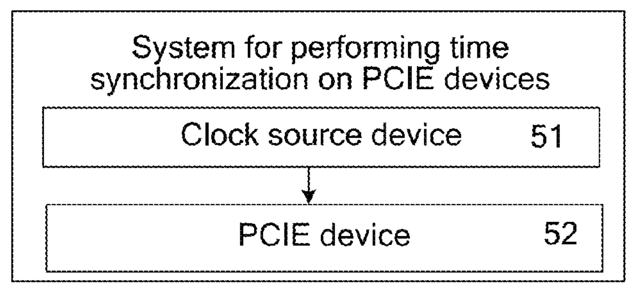
FIG. 5 is a structural diagram of a system for performing time synchronization on PCIE devices according to Embodiment 2 of the present invention.

The embodiment provides a system for performing time synchronization on PCIE devices. The specific structure of the system is shown in FIG. 5, including the following modules.

a clock source device 51, configured to send a time synchronization signal to a PCIE device, where the clock source device and the PCIE device are independent from each other and equal in status; and a PCIE device 52, configured to receive, through a hardware interface, the time synchronization signal sent from the clock source device, parse the time synchronization signal to obtain clock information carried in the time synchronization signal, and use the clock information as a clock of the PCIE device so as to implement clock synchronization with other PCIE devices.

From the technical solution provided in the foregoing embodiment of the present invention, it can be seen that, in the embodiment of the present invention, a PCIE device receives, through a hardware interface, a time synchronization signal sent from a clock source device and performs the time synchronization processing according to the time synchronization signal, so that the requirements of PCIE devices for the clock synchronization or the time synchronization may be satisfied.

Figure 6:
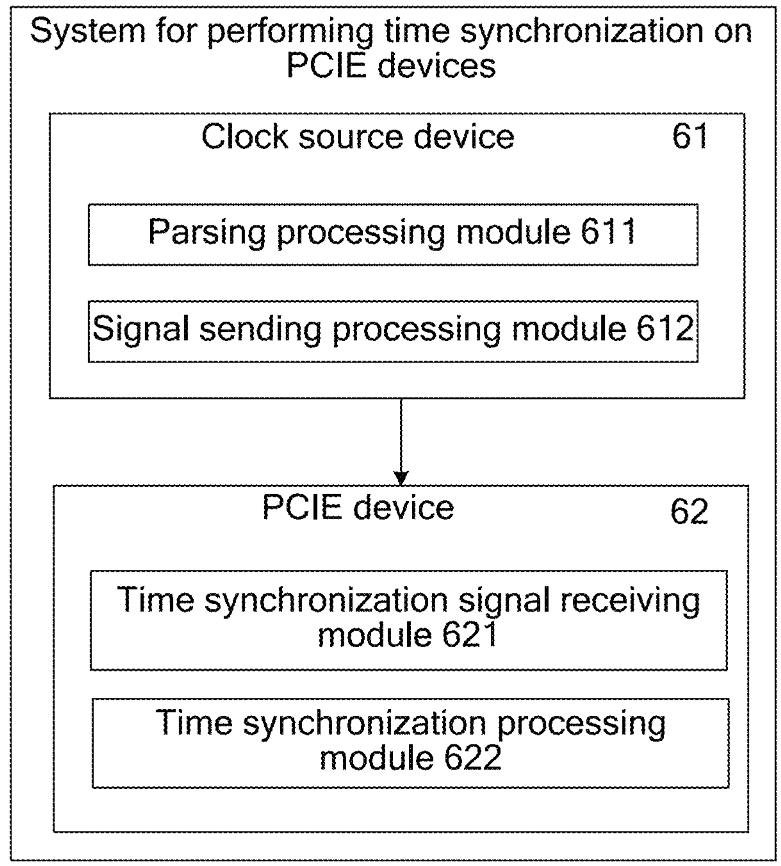
FIG. 6 is a structural diagram of another system for performing time synchronization on PCIE devices according to Embodiment 2 of the present invention.

The embodiment further provides another system for performing time synchronization on PCIE devices. The specific structure of the system is as shown in FIG. 6, including the following modules:

a clock source device 61, configured to send a time synchronization signal to a PCIE device, where the clock source device and the PCIE device are independent from each other and are equal in status; and a PCIE device 62, configured to receive, through a hardware interface, the time synchronization signal sent from the clock source device, parse the time synchronization signal to obtain clock information carried in the time synchronization signal, and use the clock information as a clock of the PCIE device, so as to implement clock synchronization with other PCIE devices.

Specifically, the clock source device 61 may include:

a parsing processing module 611, configured to parse a received clock signal from an upper-level clock source device or a time synchronization network to obtain a time synchronization signal of the PCIE device; and a signal sending processing module 612, configured to send the time synchronization signal obtained by the parsing processing module to a plurality of PCIE devices separately.

Specifically, the clock source device 61 may further include a master clock source device and a slave clock source device. When the master clock source device has a failure or when no time synchronization signal of the master clock source device meets the requirement, the master clock source device is replaced with the slave clock source device to send a time synchronization signal.

Specifically, the PCIE device 62 may include:

a time synchronization signal receiving module 621, configured to receive, through the hardware interface, the time synchronization signal sent from the clock source device; and a time synchronization processing module 622, configured to parse the time synchronization signal received by the time synchronization signal receiving module to obtain the clock information carried in the time synchronization signal, and use the clock information as a clock of the time synchronization processing module 622, thereby implementing the clock synchronization among a plurality of PCIE devices.

The embodiment further provides a PCIE device, including a hardware interface that is used as a synchronization signal interface. The PCIE device is configured to receive, through the hardware interface, a time synchronization signal sent by a clock source device, parse the time synchronization signal to obtain clock information carried in the time synchronization signal, and use the clock information as a clock of the PCIE device, so as to implement the clock synchronization with other PCIE devices.

Figure 7:
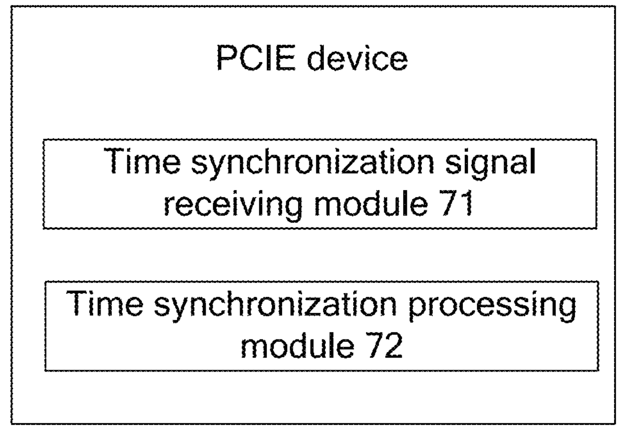
FIG. 7 is a specific structural diagram of a PCIE device according to Embodiment 2 of the present invention.

The specific structure of the PCIE device is shown in FIG. 7, which specifically includes:

a time synchronization signal receiving module 71, configured to receive, through the hardware interface, the time synchronization signal sent from the clock source device; and a time synchronization processing module 72, configured to parse the time synchronization signal received by the time synchronization signal receiving module 71 to obtain the clock information carried in the time synchronization signal and use the clock information as a clock of the PCIE device, so as to implement the clock synchronization with the other PCIE devices.

Specifically, the synchronization signal interface is independent from a non-synchronization signal interface of the PCIE device; or, the synchronization signal interface is implemented by reforming an interface of the PCIE device.

Persons of ordinary skill in the art may understand that, all or a part of processes in the method according to the embodiments may be accomplished by a computer program instructing relevant hardware. The program may be stored in a computer-readable storage medium. When the program is executed, the process of the method according to the embodiments of the present invention is performed. The storage medium may be a magnetic disk, an optical disk, a read-only memory (Read-Only Memory, ROM), or a random access memory (Random Access Memory, RAM).

To sum up, in the embodiments of the present invention, a PCIE device receives, through a hardware interface, a time synchronization signal sent from a clock source device and performs the time synchronization processing according to the time synchronization signal, so that the requirements of PCIE devices for the clock synchronization or the time synchronization may be satisfied.

Through the embodiment of the present invention, a hardware processing mechanism is adopted. The PCIE device is supported to access a synchronous network, and the PCIE device is supported to be used as a global clock source. Requirements of current wireless communication devices for the GPS are reduced; the reliability and security of the system are increased; the cost of the system is lowered; and the maintenance thereof is easy.

Through the embodiment of the present invention, an equal relationship among the PCIE devices is implemented, and the time reference source is unrelated to the statuses of the devices.

The foregoing descriptions are merely exemplary embodiments of the present invention, but the protection scope of the present invention is not limit thereto. Various modifications and variations readily conceived by persons skilled in the art within the technical scope disclosed by the present invention shall fall within the scope of the present invention. Therefore, the protection scope of the invention should be subject to the protection scope of the claims.

What is claimed is:

1. A method for performing time synchronization on a peripheral component interconnect express (PCIE) device, comprising:

receiving, by the PCIE device through a synchronization signal interface, a time synchronization signal sent from a clock source device, wherein the time synchronization signal comprises a 1 pulse per second (1 PPS) signal and a Time Of Date (TOD) signal;

parsing, by the PCIE device, the time synchronization signal to obtain clock information and time signal carried in the time synchronization signal; and performing, by the PCIE device, the time synchronization according to the clock information and the time signal;

wherein the clock source device comprises a master clock source device and a slave clock source device, and the method further comprises:

replacing, by the PCIE device, the master clock source device with the slave clock source device to send the time synchronization signal, when the master clock source device has a failure or when no time synchronization signal of the master clock source device meets the requirement.

2. The method for performing time synchronization on the PCIE device according to claim 1, wherein the synchronization signal interface comprises a clock phase discrimination circuit and a TOD communication interface.

3. The method for performing time synchronization on the PCIE device according to claim 1, wherein the PCIE device through an exclusive chip or a Field-Programmable Gate Array (FPGA), parses the time synchronization signal to extract the clock information and the time signal carried in the time synchronization signal.

4. The method for performing time synchronization on the PCIE device according to claim 1, wherein the PCIE device is independent from the clock source device.

5. A system for performing time synchronization on a peripheral component interconnect express (PCIE) device, comprising:

a clock source device, configured to send a time synchronization signal to the PCIE device, wherein the clock source device and the PCIE device are independent from each other; and the PCIE device, comprising a synchronization signal interface, and configured to receive, through the synchronization signal interface, the time synchronization signal sent from the clock source device, parse the time synchronization signal to obtain clock information and time signal carried in the time synchronization signal, and perform the time synchronization according to the clock information and the time signal, wherein the time synchronization signal comprises a 1 pulse per second (1 PPS) signal and a Time Of Date (TOD) signal;

wherein the clock source device comprises a master clock source device and a slave clock source device, and the PCIE device is further configured to replace the master clock source device with the slave clock source device to send the time synchronization signal, when the master clock source device has a failure or when no time synchronization signal of the master clock source device meets the requirement.

6. The system for performing time synchronization on the PCIE device according to claim 5, wherein the synchronization signal interface comprises a clock phase discrimination circuit and a TOD communication interface.

7. The system for performing time synchronization on the PCIE device according to claim 5, wherein the PCIE device through an exclusive chip or a Field-Programmable Gate Array (FPGA), parses the time synchronization signal to extract the clock information and the time signal carried in the time synchronization signal.

8. The system for performing time synchronization on the PCIE device according to claim 5, wherein the clock source device is further configured to parse a received clock signal from an upper-level clock source device or a time synchronization network to obtain time synchronization signal of the PCIE devices.

* * * * *